United States Patent
Saxena et al.

(10) Patent No.: US 12,502,428 B1
(45) Date of Patent: Dec. 23, 2025

(54) IMMUNOTHERAPEUTIC COMPOSITION FOR PREVENTION OF OBESITY, NONALCOHOLIC FATTY LIVER DISEASE AND HYPERTRIGLYCERIDEMIA, AND METHODS OF USE AND PREPARATION THEREOF

(71) Applicant: Utopia Therapeutics Pvt Ltd., Telangana (IN)

(72) Inventors: Uday Saxena, Hyderabad (IN); Gopi Kadiyala, Karnataka (IN)

(73) Assignee: Utopia Therapeutics Pvt Ltd., Telangana (IN)

( * ) Notice: Subject to any disclaimer, the term of this patent is extended or adjusted under 35 U.S.C. 154(b) by 0 days.

(21) Appl. No.: 19/194,986

(22) Filed: Apr. 30, 2025

(51) Int. Cl.
| | |
|---|---|
| A61K 39/395 | (2006.01) |
| A61K 9/00 | (2006.01) |
| A61K 39/385 | (2006.01) |
| A61K 47/02 | (2006.01) |
| A61P 1/16 | (2006.01) |
| A61P 3/04 | (2006.01) |
| A61P 3/06 | (2006.01) |
| A61K 39/00 | (2006.01) |

(52) U.S. Cl.
CPC .......... *A61K 39/385* (2013.01); *A61K 9/0019* (2013.01); *A61K 47/02* (2013.01); *A61P 1/16* (2018.01); *A61P 3/04* (2018.01); *A61P 3/06* (2018.01); *A61K 2039/54* (2013.01); *A61K 2039/55505* (2013.01); *A61K 2039/55561* (2013.01); *A61K 2039/55577* (2013.01); *A61K 2039/6037* (2013.01)

(58) Field of Classification Search
None
See application file for complete search history.

(56) References Cited

U.S. PATENT DOCUMENTS

| | | | |
|---|---|---|---|
| 6,288,213 B1 | 9/2001 | Stahl et al. | |
| 6,657,049 B1 * | 12/2003 | Stahl | C12N 9/93 530/387.9 |
| 11,446,398 B2 * | 9/2022 | Barrett | C12N 9/93 |
| 2003/0165430 A1 | 9/2003 | Shulman et al. | |
| 2018/0318407 A1 | 11/2018 | Champion et al. | |

FOREIGN PATENT DOCUMENTS

| | | |
|---|---|---|
| WO | 2017170494 | 2/2019 |
| WO | 2021001804 | 1/2021 |

OTHER PUBLICATIONS

Jean-Charles Fruchart, Raúl D. Santos, Carlos A. Aguilar-Salinas, Masanori Aikawa, Khalid Al-Rasadi, Pierre Amarenco, Philip J. Barter, et al.. "The selective peroxisome proliferator-activated receptor alpha modulator (SPPARMα) paradigm: conceptual framework and therapeutic potential". Cardiovascular Diabetology, 2019, https://doi.org/10.1186/s12933-019-0864-7.

Tomás Cerdó, José Antonio García-Santos, Mercedes García-Bermúdez, Cristina Campoy. "The Role of Probiotics and Prebiotics in the Prevention and Treatment of Obesity". Nutrients, 2019, https://doi.org/10.3390/nu11030635.

Behbahani, Sara. "The role of GLP-1 receptor agonist as a potential treatment for non-alcoholic fatty liver disease and non-alcoholic steatohepatitis". 2017, https://open.bu.edu/bitstream/2144/26621/5/Behbahani_bu_0017N_13233.pdf.

Brennan, Paul N., Elsharkawy, Ahmed M., Fallowfield, Jonathan A., Kendall, et al.. "Antifibrotic therapy in nonalcoholic steatohepatitis: time for a human-centric approach". 2023, https://core.ac.uk/download/573471505.docx.

Banach, M., Surma, S., Toth, P.P. (2023) 2023: The year in cardiovascular disease—the year of new and prospective lipid lowering therapies. Can we render dyslipidemia a rare disease by 2024? Arch Med Sci. 19(6):1602-1615.

Balling, M., Afzal, S., Davey Smith, G., Varbo, A., Langsted, A., Kamstrup, P.R., Nordestgaard, BG. (2023) Elevated LDL Triglycerides and Atherosclerotic Risk. J Am Coll Cardiol. 81(2):136-152.

Park, K.Y., Hong, S., Kim, K.S., Han, K., Park, C.Y. (2023) Trends in Prevalence of Hypertriglyceridemia and Related Factors in Korean Adults: A Serial Cross-Sectional Study. J Lipid Atheroscler. 12(2):201-212.

Ruiz-Garcia, A., Arranz-Martinez, E., López-Uriarte, B., Rivera-Teijido, M et al. (2020) Prevalence of hypertriglyceridemia in adults and related cardiometabolic factors. SIMETAP-HTG study. Clin InvestigArterioscler. 32 (6):242-255.

Krahenbuhl, S., Pavik-Mezzour, I., von Eckardstein, A. (2016) Unmet Needs in LDL-C Lowering: When Statins Won't Do! Drugs. 76(12):1175-90.

Heemskerk, M.M., van den Berg, S.A., Pronk, A.C., van Klinken, J.B., Boon, M.R., Havekes, L.M., Rensen, P.C., van Dijk, K.W., van Harmelen, V. (2014) Long-term niacin treatment induces insulin resistance and adrenergic responsiveness in adipocytes by adaptive downregulation of phosphodiesterase 3B. Am J Physiol Endocrinol Metab. 306(7):E808-13.

(Continued)

Primary Examiner — Yunsoo Kim
(74) Attorney, Agent, or Firm — Dentons US LLP

(57) ABSTRACT

This disclosure provides a vaccine including a peptide with the amino acid sequence of SEQ ID NO:1; a nucleotide having the sequence of SEQ ID NO:2; or a ribonucleotide having the sequence of SEQ ID NO:3. In certain embodiments, the vaccine further comprises a buffer and/or an adjuvant.

10 Claims, 3 Drawing Sheets

Specification includes a Sequence Listing.

(56) References Cited

OTHER PUBLICATIONS

Golanski, J., Szymanska, P., Rozalski, M. (2021) Effects of Omega-3 Polyunsaturated Fatty Acids and Their Metabolites on Haemostasis-Current Perspectives in Cardiovascular Disease. Int J Mol Sci. 22(5):2394.
Jakob, T., Nordmann, A.J., Schandelmaier, S., Ferreira-González, I., Briel, M. (2016) Fibrates for primary prevention of cardiovascular disease events. Cochrane Database Syst Rev. 11(11):CD009753.
Kazantzis, M., Stahl, A. (2012) Fatty acid transport proteins, implications in physiology and disease. BiochimBiophys Acta. 1821(5):852-7.

* cited by examiner

IMMUNOTHERAPEUTIC COMPOSITION FOR PREVENTION OF OBESITY, NONALCOHOLIC FATTY LIVER DISEASE AND HYPERTRIGLYCERIDEMIA, AND METHODS OF USE AND PREPARATION THEREOF

CROSS-REFERENCE TO RELATED APPLICATIONS

This application claims benefit to Indian Provisional Patent Application No. 202541011940 filed on Feb. 12, 2025, the entire content of which is hereby incorporated by reference as if fully set forth herein.

INCORPORATION OF SEQUENCE LISTING

The sequence listing that is contained in the file named "15817072-000002_ST26.xml", which is 3,632 bytes (measured in MS-Windows) and created on Jul. 1, 2025, is filed herewith by electronic submission and incorporated herein by reference.

TECHNICAL FIELD

The present disclosure relates to the field of biological sciences, and more specifically, to the field of metabolic diseases. In particular, this disclosure pertains to peptide-based vaccines and immunogenic compositions. More specifically, it concerns peptide-based vaccines for the treatment of cardiovascular and metabolic disorders, such as hypertriglyceridemia (HTG), nonalcoholic fatty liver disease, and obesity.

BACKGROUND

The accumulation of fatty acids in various tissues can lead to different diseases. Excess build up of fatty acids in adipose tissue, especially the visceral adipose, leads to central obesity. Similarly, accumulation of fatty acids in the liver can lead to nonalcoholic fatty liver disease (NAFLD). When the liver has excess fatty acids, it secretes these in the form of triglycerides to cause hypertriglyceridemia. Each of these is currently treated by different drugs. Thus, targeting fatty acid accumulation by a therapeutic specifically in liver and adipose can result in improvement treatment of these diseases.

Obesity is a complex metabolic disorder characterized by excessive accumulation of fat in the body, leading to numerous health complications, including fatty liver disease, cardiovascular disorders, and impaired immune function. The pathogenesis of obesity involves a complex interplay between genetic, environmental, and lifestyle factors, which contribute to the dysregulation of the body's neuroendocrine circuits that control food intake and basal metabolism.

Emerging evidence suggests that obesity is also associated with alterations in the immune system, leading to a state of chronic low-grade inflammation. This chronic inflammation plays a crucial role in the development of obesity-related comorbidities, such as insulin resistance, type 2 diabetes, and non-alcoholic fatty liver disease. Adipose tissue, in particular, is a major source of pro-inflammatory cytokines, such as tumor necrosis factor-alpha and interleukin-6, which can directly impair insulin action and contribute to the development of insulin resistance.

The excessive accumulation of triglycerides within adipocytes leads to adipocyte hypertrophy and hyperplasia, disrupting normal adipokine secretion and initiating a state of chronic low-grade inflammation. This inflammatory state, characterized by increased levels of pro-inflammatory cytokines such as tumor necrosis factor-alpha and interleukin-6, contributes to systemic insulin resistance, a hallmark of obesity and a key driver of metabolic dysfunction. Furthermore, obesity is strongly associated with alterations in gut microbiota composition, impacting energy extraction from food and influencing metabolic homeostasis.

Nonalcoholic fatty liver disease (NAFLD), a spectrum of hepatic disorders characterized by excessive lipid accumulation in the liver, has emerged as a significant consequence of the global obesity epidemic and is now recognized as the most common chronic liver disease worldwide. NAFLD encompasses a range of conditions, from simple steatosis, characterized by fat accumulation in the liver without significant inflammation or fibrosis, to nonalcoholic steatohepatitis, a more severe form characterized by hepatocellular injury, inflammation, and fibrosis, which can progress to cirrhosis and liver failure. The pathogenesis of NAFLD is complex and multifactorial, involving the interplay of insulin resistance, oxidative stress, inflammation, and genetic factors. Insulin resistance, a key feature of obesity and type 2 diabetes, plays a central role in the development of NAFLD by promoting hepatic lipogenesis, impairing fatty acid oxidation, and increasing the influx of free fatty acids from adipose tissue to the liver. The excessive accumulation of lipids in the liver leads to lipotoxicity, causing cellular damage, oxidative stress, and inflammation, ultimately contributing to the progression of NAFLD. Moreover, genetic polymorphisms in genes involved in lipid metabolism and inflammation have been shown to influence an individual's susceptibility to NAFLD and its progression.

The close association between obesity and NAFLD underscores the importance of addressing both conditions simultaneously to mitigate the risk of adverse health outcomes. Lifestyle interventions, including dietary modifications and increased physical activity, remain the cornerstone of treatment for both obesity and NAFLD, aiming to reduce body weight and decrease hepatic steatosis. Bariatric surgery, a more invasive approach, can be highly effective in achieving significant weight loss and improving metabolic health in severely obese individuals with NAFLD, but it is important to carefully consider the risks and benefits of this procedure.

Addressing obesity requires a multifaceted approach due to its complex etiology involving lifestyle, genetic, and metabolic factors. Lifestyle modifications, including dietary changes and increased physical activity, remain the cornerstone of obesity management and NAFLD; however, their long-term effectiveness is often limited by adherence challenges and biological adaptations. Recent advances have focused on targeting metabolic pathways, which play a crucial role in energy homeostasis and inflammation. Therapeutic strategies that modulate gut microbiota through prebiotics and probiotics show early promise in improving metabolic parameters, although further research is needed to establish standardized protocols and personalized treatments. Pharmacological interventions also offer potential benefits, particularly agents that improve lipid metabolism and insulin sensitivity. Notably, selective peroxisome proliferator-activated receptor (PPAR) alpha modulators represent a class aimed at correcting dyslipidemia in insulin-resistant patients, thereby indirectly addressing obesity-related comorbidities. However PPAR related drugs have not shown any effect on obesity in humans, and only modest effect on NAFLD, if any.

Therefore current therapies often fall short in achieving sustained weight loss and metabolic normalization, highlighting the need for integrated, individualized treatment regimens. Therefore, pharmacological interventions are gaining in importance to address this growing epidemic. Several drug classes show activity; for instance, glucagon-like peptide-1 receptor agonists (GLP-1 RAs), such as liraglutide and its more potent analog semaglutide, have demonstrated potential in reducing obesity alongside improving glycemic control and promoting weight loss. But the major mechanism of action of these drugs for obesity is appetite suppression, which not only results in weight loss but may also induce muscle loss and malnutrition. The effectiveness of pharmacotherapies in reversing fibrosis, a critical determinant of morbidity in nonalcoholic steatohepatitis (NASH), remains severely limited. Despite numerous clinical trials, no FDA-approved antifibrotic agents currently exist, highlighting a significant therapeutic gap. The complexity of NAFLD/NASH pathogenesis and individual variability necessitates a move toward targeted medicine approaches, aiming to enhance efficacy and target genetic susceptibilities.

Cardiovascular diseases (CVDs) are a leading cause of death worldwide. They include a wide range of conditions affecting the heart and blood vessel, many of which are associated with atherosclerosis. Atherosclerosis is characterized by the buildup of plaque within the artery walls, leading to narrowing of the arteries and restricted blood flow. If a blood clot forms in a narrowed it can trigger a heart attack or stroke.

Triglycerides are the most common form of fat found in the human body and serve as a storage form for excess energy derived from food. Low density lipoprotein (LDL) cholesterol is commonly referred to as "unfavorable" or "bad" cholesterol because it contributes to the buildup of fatty deposits within the arterial walls, a condition known as atherosclerosis. Elevated triglycerides levels, particularly when accompanies by high LDL cholesterol or low levels of high-density lipoprotein (HDL)—often termed as "good" cholesterol—can promote the accumulation of these fatty deposits in the arteries. This, in turn, increases the risk of cardiovascular events such as heart attacks and strokes. Studies have shown that elevated LDL which contain high triglycerides are strongly associated with a heightened risk of cardiovascular diseases, including brain stroke.

Hypertriglyceridemia (HTG) is a medical condition characterized by abnormally high levels of triglycerides in the blood (>200 mg/dl). HTG can be classified based on the degree of triglyceride (TG) elevation or whether it is primary or secondary in origin. Primary HTG is typically polygenic, meaning that it arises from the combined effect of multiple genes rather than a single gene mutation. In contrast, secondary HTG results from external factors such as lifestyle factors, underlying medical conditions, or the use of certain medications. While mild-to-moderate HTG is linked to an increased risk of atherosclerotic cardiovascular disease, severe HTG may also lead to acute pancreatitis.

Cholesterol-lowering medications have significantly contributed to the reduction of heart disease. Among these, statin therapy has proven to be particularly effective in lowering LDL cholesterol (LDL-C) levels and reducing the risk of heart disease. However, the use of statins has been associated with various adverse effects, including severe muscle discomfort and other complications, which can limit their tolerability and long-term use.

Niacin is another lipid-lowering agent known for its ability to inhibit cyclic adenosine monophosphate (cAMP) production in adipose cells, thereby reducing the release of fatty acids. Despite its efficacy, long-term use of niacin may lead to normalization of circulating fatty acid levels and the development of insulin resistance. Several studies suggest that the suppression of cAMP to lower lipid levels may contribute to metabolic disturbances, including increased insulin resistance and an elevated cAMP response.

Omega-3 fatty acid therapies have been shown to provide dose-dependent cardiovascular benefits. However, these treatments are not without risks, as they have been associated with an increased incidence of bleeding and atrial fibrillation. Similarly, fibrates—though effective in reducing serum triglycerides—can cause adverse effects such as dyspepsia, muscle pain, and myopathy, particularly in individuals with type 2 diabetes and other metabolic disorders.

Angptl3 based vaccines for the treatment of liver-related conditions are known. For example, WO2021001804A1 discloses a vaccine capable of inducing the formation of antibodies directed to angiopoietin-like 3 in vivo. More specifically, it discloses the use of vaccines that are able to influence the angiopoietin-like 3 mediated immune response for the treatment of liver diseases such as non-alcoholic steatohepatitis and non-alcoholic fatty liver disease and hyperlipidemia, hypercholesterolemia, or atherosclerosis, including the complications lead to the cardiovascular diseases (CVD) that cause morbidity and mortality. For example, WO2017170494A1 discloses a vaccine formulation comprising a carrier protein and a fusion protein where a full length of one or more ghrelin polypeptides are fused, wherein the vaccine formulation induces general immunity and mucosal immunity. The vaccines disclosed in WO2017170494A1 suffer from side effects and are not precisely targeted.

Consequently, individuals at risk for cardiovascular disease often require multiple medications as a preventive strategy. It is important to recognize that widely prescribed treatments—such as statins, niacin, omega-3 fatty acids, and fibrates—are frequently associated with significant side effects. This highlights a pressing need for an innovative approach that can more effectively and safely address conditions such as hypertriglyceridemia, nonalcoholic fatty liver disease, and obesity. Therefore, novel therapeutic strategies to effectively prevent and treat these increasingly prevalent conditions would represent a significant advance in the art.

SUMMARY

The current disclosure presents a precisely designed peptide antigen as a vaccine for cardiovascular ailments, such as obesity, NAFLD and hypertriglyceridemia, through the specific targeting of a cell surface protein known as fatty acid transport protein 1 (FATP1). Such a precisely designed peptide antigen as a vaccine through the specific targeting of FATP1 is not known in the art. The current disclosure describes a peptide vaccine targeting FATP1 for prevention of cardiovascular disease, such as hypertriglyceridemia, nonalcoholic fatty liver disease and obesity.

The vaccine reduces the level of triglycerides in plasma, reduces visceral fat, and reduces liver fat. Further, the vaccine reduces the level of plasma triglycerides in chicken models similar to that found typically in severe hypertriglyceridemia patients with plasma triglyceride levels over 400 mg/dl. Similarly, the vaccine has also been found to decrease alkaline phosphatase (ALP) activity in the serum, demonstrating. correction of liver function. Further, the vaccine decreases serum glucose levels and cholesterol levels.

There is marked decrease in visceral fat accumulation, weight loss and fatty liver formation in several animal models with vaccine treatment with no change in food or water intake. Similar results were also found in rat and mice models. Collectively, these data show that the vaccine can treat obesity, fatty liver and hypertriglyceridemia.

The present disclosure provides a vaccine comprising: a) a peptide with the amino acid sequence MRAPGAGAASVVS (SEQ ID NO:1); b) a nucleotide with the sequence ATGCGTGCACCGGGCGCGGGCGCAGCAAGTGTGGTGAGT (SEQ ID NO:2); or c) a ribonucleotide with the sequence AUGCGUGCACCGGGCGCGGGCGCAGCAAGUGUGGUGAGT (SEQ ID NO:3). In the peptide sequence, the PGAG sequence creates a flexible region that contributes to the antigenicity of the peptide, and the VVS sequence influences membrane interactions with B and T lymphocytes to induce a higher immune response.

In certain embodiments, the peptide comprises an amino acid substitution or a chemical modification, or is conjugated to an immunogenic protein, or the nucleotide or ribonucleotide encoding SEQ ID NO:1 comprises a nucleotide or ribonucleotide substitution that results in an amino acid substitution in SEQ ID NO:1. In some embodiments, the amino acid substitution or chemical modification improves the stability in vitro or in vivo, or changes the in vivo depot characteristics or immunogenicity of the vaccine. In other embodiments, the peptide is conjugated with an immunogenic protein, polyethylene glycol or a VLP to enhance the immunogenicity. In still other embodiments, the conjugation with the immunogenic protein or polyethylene glycol improves the plasma stability or half-life in vitro or in vivo, or changes the in vivo depot characteristics or immunogenicity of the vaccine. In further embodiments, the quantity of the peptide in the vaccine ranges from about 0.1 mg to about 4.5 mg or from about 0.4 mg to about 4.4 mg. In still further embodiments, the quantity of the peptide in the vaccine ranges from about 0.5 mg to about 3 mg. In particular embodiments, the peptide comprises at least a first D-amino acid, while in other embodiments, the peptide is comprised mostly or entirely of D-amino acids to improve the peptide's half-life by avoiding proteolysis in circulation.

In further embodiments, the vaccine comprises a buffer. In certain embodiments, the buffer comprises phosphate-buffered saline (PBS). In some embodiments, the buffer comprises comprising 137 mM NaCl, 2.7 mM KCl, 10 mM $Na_2HPO_4$, and 1.8 mM $KH_2PO_4$. In still further embodiments, the vaccine comprises an adjuvant or a carrier protein. In certain embodiments, the adjuvant is alum. In additional embodiments, the quantity of the adjuvant in the vaccine ranges from about 0.1 ml to about 0.6 ml when used for intramuscular injection. In other embodiments, the quantity of the adjuvant in the vaccine ranges from about 0.25 ml to about 0.5 ml. In embodiments where the vaccine is used for subcutaneous injection, the amount of the adjuvant ranges from about 0.05 ml to about 0.2 ml. In certain embodiments, the adjuvant is alum. In one embodiment, the alum is present in an amount from about 100 µg to about 506 µg. In further embodiments, the vaccine is a pharmaceutical composition comprising a pharmaceutically acceptable carrier.

The present disclosure also provides a method for lowering triglyceride levels is a vertebrate subject in need thereof, comprising administering to the subject a therapeutically effective amount of a vaccine comprising: a) a peptide with the amino acid sequence MRAPGAGAASVVS (SEQ ID NO:1); b) a nucleotide with the sequence ATGCGTGCACCGGGCGCGGGCGCAGCAAGTGTGGTGAGT (SEQ ID NO:2); or c) a ribonucleotide with the sequence AUGCGUGCACCGGGCGCGGGCGCAGCAAGUGUGGUGAGT (SEQ ID NO:3). In certain embodiments, the method prevents or treats obesity, nonalcoholic fatty liver disease or hypertriglyceridemia in the subject. In some embodiments, the method prevents or treats obesity in the subject. In other embodiments, the method prevents or treats nonalcoholic fatty liver disease in the subject. In yet other embodiments, the method prevents or treats hypertriglyceridemia in the subject. In particular embodiments, the vaccine is administered intramuscularly, intradermally, subcutaneously, topically, orally, or via a transdermal patch or topical cream. In some embodiments, the vaccine comprises about 0.1 mg to about 4.5 mg of the peptide.

In further embodiments, the vaccine comprises a buffer. In certain embodiments, the buffer comprises phosphate-buffered saline (PBS). In some embodiments, the buffer comprises comprising 137 mM NaCl, 2.7 mM KCl, 10 mM $Na_2HPO_4$, and 1.8 mM $KH_2PO_4$. In still further embodiments, the vaccine comprises an adjuvant or a carrier protein. In certain embodiments, the adjuvant is alum. In additional embodiments, the quantity of the adjuvant in the vaccine ranges from about 0.1 ml to about 0.6 ml when used for intramuscular injection. In other embodiments, the quantity of the adjuvant in the vaccine ranges from about 0.25 ml to about 0.5 ml. In embodiments where the vaccine is used for subcutaneous injection, the amount of the adjuvant ranges from about 0.05 ml to about 0.2 ml. In certain embodiments, the adjuvant is alum. In one embodiment, the alum is present in an amount from about 100 µg to about 506 µg.

In certain embodiments, the vertebrate subject is a mammal. In other embodiments, the vertebrate subject is a human. In yet other embodiments, the vertebrate subject is a chicken. In certain embodiments, the method further comprises administering an additional composition that lowers lipid levels to the vertebrate subject. In some embodiments, at least two doses of the vaccine are administered to the patients to reduce triglyceride levels. In other embodiments the vaccine is administered as multiple-doses of 100 µg-150 µg antigen/dose.

Additionally, the present disclosure provides a method of preparing a peptide vaccine targeting fatty acid transporter protein 1 (FATP1), said method comprising: a) dissolving a peptide with the amino acid sequence MRAPGAGAASVVS (SEQ ID NO:1) in 1× buffer; and b) adding an adjuvant. In certain embodiments, the buffer comprises phosphate-buffered saline (PBS). In other embodiments, the adjuvant comprises alum. In some embodiments, the quantity of the peptide in the vaccine ranges from about 0.1 mg to about 4.5 mg. In yet other embodiments, the quantity of the adjuvant in the vaccine ranges from about 0.1 ml to about 0.6 ml.

The present disclosure further provides a method for alleviating a FATP1-related disorder in a subject, comprising administering to the subject a therapeutically effective amount of an immunogen comprising an antigenic FATP1 peptide linked to an immunogenic carrier, wherein the antigenic FATP1 peptide consists of the amino acid sequence of SEQ ID NO:1, and wherein the FATP1-related disorder is selected from the group consisting of obesity, nonalcoholic fatty liver disease and hypertriglyceridemia. In certain embodiments, the immunogenic carrier is serum albumins such as bovine serum albumin (BSA); globulins; thyroglobulins; hemoglobins; hemocyanins; polylysin; polyglutamic acid; lysine-glutamic acid copolymers; copolymers containing lysine or ornithine; liposome carriers; the purified protein derivative of tuberculin (PPD); inactivated bacterial toxins or toxoids such as tetanus or diptheria toxins (TT and DT) or fragment C of TT, CRM197 (a nontoxic but antigenically identical variant of diphtheria toxin) other DT point mutants, such as CRM176, CRM228, CRM 45; CRM 9, CRM102, CRM 103 and CRM107 and other mutations described in the art. In particular embodiments, the immunogenic carrier is diphtheria toxoid, CRM197 or a virus-like particle (VLP). In some embodiments, the immunogenic carrier is a VLP selected from the group consisting of hepatitis B core antigen (HBcAg), hepatitis B surface antigen (HBsAg), Qbeta bacteriophage, PP7, PPV or Norwalk virus VLP. In other embodiments, the immunogen further comprises, between the antigenic peptide and carrier, a peptide linker at the C terminus and/or the N-terminus of the peptide. The linker can generally range in length from a few (2, 3, 4 or 5) amino acids, to 10, 15 20 or 25 amino acids or more.

In additional embodiments, the method further comprises administering to the subject a therapeutically effective amount of an adjuvant. In certain embodiments, the adjuvant is alum, aluminum phosphate, aluminum hydroxide, MF59 (4.3% w/v squalene, 0.5% w/v polysorbate 80 (Tween 80), 0.5% w/v sorbitan trioleate (Span 85)), CpG-containing nucleic acid (where the cytosine is unmethylated), QS21 (saponin adjuvant), MPL (Monophosphoryl Lipid A), 3DMPL (3-O-deacylated MPL), extracts from Aquilla, ISCOMS, LT/CT mutants, poly(D,L-lactide-co-glycolide) (PLG) microparticles, Quil A, TiterMax classic, TiterMax Gold, interleukins, and the like. For veterinary applications, including, but not limited to, animal treatment or experimentation, one can use Freund's adjuvant, N-acetyl-muramyl-L-threonyl-D-isoglutamine (thr-MDP), N-acetyl-nor-muramyl-L-alanyl-D-iso-glutamine (CGP 11637, referred to as nor-MDP), N-acetyl-muramyl-L-alanyl-D-isoglutaminyl-L-alanine-2-(1'-2'-dipalmitoyl-sn-glycero-3-hydroxyphosphoryloxy)-ethylamine (CGP 19835A, referred to as MTP-PE), and RIBI, which contains three components extracted from bacteria, monophosphoryl lipid A, trehalose dimycolate and cell wall skeleton (MPL+TDM+CWS) in a 2% squalene/Tween 80 emulsion. In particular embodiments, the adjuvant is alum, CpG, oligodeoxynucleotides (ODN) or QS21 (saponin adjuvant).

In addition, the present disclosure provides a vaccine comprising: (a) a peptide with the amino acid sequence of SEQ ID NO:1, a nucleotide encoding the amino acid sequence of SEQ ID NO:1, or a ribonucleotide encoding the amino acid sequence of SEQ ID NO:1; (b) a buffer; and (c) an adjuvant.

The present disclosure also provides a vaccine comprising: a) an immunogenic component(s) that triggers immune response to suppress the appetite or fat accumulation; b) an immunogenic component(s) comprising an FATP1 protein or a fragment thereof; c) a peptide with the amino acid sequence of SEQ ID NO:1; d) a nucleotide encoding the amino acid sequence of SEQ ID NO:1; or a fragment thereof; e) a ribonucleotide encoding the amino acid sequence of SEQ ID NO:1 or a fragment thereof; f) an adjuvant selected from the group consisting of alum, TLR agonists, CpG, ODN, QS21, a liposomal formulation or a nanoparticle based formulation; and/or g) a pharmaceutically acceptable carrier, wherein vaccine induces an immune response that reduces the bioactivity of an FATP1 protein or fragment thereof, expression of an FATP1 gene or a fragment thereof, to suppress appetite or fat accumulation.

The present disclosure additionally provides a method for treating or preventing obesity in a subject, comprising administering a therapeutically effective dose of a vaccine comprising an FATP1 protein or a fragment thereof conjugated to a carrier protein, wherein the vaccine generates neutralizing antibodies against the FATP1 or fragment thereof to reduce body weight. In certain embodiments, the FATP1 fragment comprises the amino acid sequence of SEQ ID NO:1.

The present disclosure further provides a recombinant probiotic bacterial strain that expresses a nucleotide or ribonucleotide sequence that encodes SEQ ID NO:1 or a fragment thereof, wherein the recombinant probiotic bacterial strain is administered orally or topically to stimulate the immune response.

Additionally, the present disclosure provides a monoclonal antibody that specifically binds to a protein comprising the amino acid sequence of SEQ ID NO:1 or a fragment thereof, wherein the antibody neutralizes FATP1 activity.

DESCRIPTION OF DRAWINGS

The set of accompanying illustrative drawings shows various exemplary embodiments of this disclosure. Such drawings are not to be construed as necessarily limiting this disclosure.

BRIEF DESCRIPTION OF THE SEQUENCES

Figure 1A:
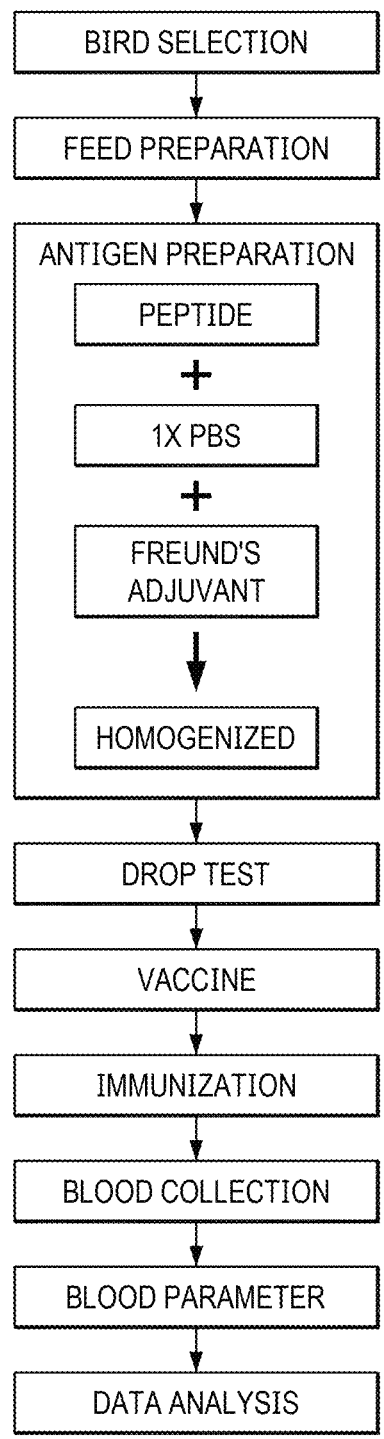
FIG. 1A and FIG. 1B shows the protocol for the study in high fat fed chickens (FIG. 1A) and the reduction of visceral fat in the chicken model in chow fed chickens (FIG. 1B).

SEQ ID NO:1—FATP1 peptide sequence
SEQ ID NO:2—DNA sequence encoding SEQ ID NO:1.
SEQ ID NO:3—RNA sequence encoding SEQ ID NO:1.

DETAILED DESCRIPTION

The present disclosure is now described more fully with reference to the set of accompanying illustrative drawings, in which exemplary embodiments of this disclosure are shown. This disclosure can be embodied in many different forms and should not be construed as necessarily being limited to the exemplary embodiments disclosed herein. Rather, the exemplary embodiments are provided so that this disclosure is thorough and complete, and fully conveys various concepts of this disclosure to those skilled in a relevant art.

Obesity is a major problem in the world today. There are approximately 1.9 billion overweight adults, and 650 million of these are classified as obese, which is defined by a Body Mass Index (BMI) of 30 or higher, which is calculated by dividing weight in kilograms by height in meters squared. Beyond BMI, obesity is also assessed using waist circumference, with values above 35 inches for women and 40 inches for men indicating a higher risk of related health issues. Obesity-related diseases cost approximately $2 trillion annually, which exceeds the GDPs of many major countries. Currently, China, India and the US have the greatest number of obese patients. There is expected to be a 50% increase in global obesity cases by 2035. Current treatments have severe limitations. Weight rebound after GLP-1 drugs is well-known, and bariatric surgery is invasive, not suitable for every patient, has many side effects and is costly.

Given the significant impact of obesity on immune function and its associated health consequences, the development of an effective vaccine against obesity and fatty liver disease is of utmost importance. Such a vaccine would aim to modulate the immune response in a way that could enhance the body's ability to regulate fat metabolism, reduce inflammation, and prevent the development of obesity-related comorbidities.

The development of an effective vaccine against obesity and fatty liver disease represents a significant advancement in the management of these complex metabolic disorders. By stimulating immune response to the peptide antigen, inducing antibodies against FATP1 and ultimately restoring metabolic homeostasis, such a vaccine slows or even prevents the development of obesity-related comorbidities, fatty liver and high blood triglycerides and improves the overall health outcomes of individuals affected by these conditions.

The presently disclosed vaccine disrupts fat accumulation by targeting fat metabolism, not just appetite suppression. The presently disclosed vaccine inhibits fat accumulation by targeting fatty acid uptake pathways for sustained weight loss. The presently disclosed vaccine prevents fat accumulation in the liver and body, and has been proven to reduce circulating triglycerides, fatty liver and visceral fat, as detailed further below. With the presently disclosed vaccine there is no appetite suppression, and no weight rebound, since it works independently of hunger signals. It prevents fat storage in adipose and liver, and reduces plasma triglycerides to promote long-term metabolic health without daily injections or muscle loss.

Adipose tissue is known to play a role in obesity. Adipose tissue has a dual role: energy storage and endocrine function. Adipose tissue is not just fat storage, it regulates metabolism, immune function, and energy balance. Key roles for adipose tissue include: 1) energy reservoir by storing excess calories as triglycerides; 2) hormonal influence, by secreting adipokines (leptin, adiponectin) that impact insulin sensitivity and inflammation; and 3) inflammation trigger since excess adipose tissue leads to chronic low-grade inflammation, a key driver of metabolic disorders. Obesity transforms adipose tissue into a pro-inflammatory state, increasing the risk of insulin resistance, type 2 diabetes, and cardiovascular disease.

Understanding fatty acid metabolism is important to unlock an effective obesity treatment. Fatty acids are processed three major ways in the body:. 1) uptake—fatty acids are transported into adipocytes and liver via fatty acid transport proteins (FATPs), more specifically FATP1, which is predominantly present in adipose, muscle and liver tissues; 2) esterification—converted into triglycerides for energy storage; and 3) lipolysis—triglycerides are broken down for energy release when needed. There is metabolic dysfunction in obesity. Dysregulated fatty acid metabolism leads to excessive fat accumulation in the liver and visceral adipose fat storage (resulting in weight gain and risk for type 2 diabetes and cardiovascular disease), and obesity and NAFLD (Non-Alcoholic Fatty Liver Disease) are directly linked to this metabolic imbalance.

The presently disclosed vaccine targets fatty acid transport protein 1 (FATP1), which is abundant in adipose tissue with high tissue specificity. FATP1 facilitates fatty acid uptake into cells. It acts as a gatekeeper for lipid entry into tissues like liver and adipose. Overexpression of FATP1 leads to fat accumulation in tissues. This contributes to insulin resistance and metabolic dysfunction. Conversely, inhibiting FATP-1 reduces cellular lipid uptake.

The vaccine stimulates antibody production against FATP1. These antibodies inhibit fatty acid transport into cells. The vaccine targets individuals with metabolic disorders, and is a treatment for conditions or diseases including, but not limited to, obesity, hypertriglyceridemia, nonalcoholic fatty liver disease, diabetes, and metabolic syndrome, and can prevent metabolic disease in high-risk individuals.

The presently disclosed vaccine stimulates B-cells to produce anti-FATP1 antibodies that recognize and bind to FATP1 proteins. Antibody bound FATP1 cannot facilitate fatty acid uptake, which leads to reduced ectopic fat storage, reduced visceral adipose fat, reduced fatty liver and reduced blood triglyceride levels.

Hypertriglyceridemia is characterized by elevated serum triglyceride levels (>150 mg/dL). Severe cases exceed 500 mg/dL, risking pancreatitis. Increased FATP1 activity correlates with higher plasma triglycerides. This occurs through enhanced fatty acid uptake and VLDL production. Selective inhibition of FATP1 by the presently disclosed vaccine reduces triglyceride synthesis, which in certain cases can complement existing treatments like fibrates.

In fatty liver disease, there is an accumulation of hepatic fat. Excessive fatty acid uptake leads to triglyceride storage in hepatocytes. Studies show increased FATP1 expression in steatotic livers. Lipotoxicity triggers inflammation, oxidative stress, and fibrosis. Hepatic insulin resistance worsens with increased FATP1 activity. Selective inhibition of FATP1 by the presently disclosed vaccine reduces fatty acid uptake, thereby preventing or treating fatty liver disease.

In obesity, FATP1 facilitates fatty acid storage and adipocyte expansion and hypertrophy, leading to altered energy metabolism. Dysregulated fatty acid handling affects whole-body metabolism. This leads to impaired thermogenesis, since FATP1 overexpression reduces brown fat activity. Excess lipid accumulation promotes metabolic dysfunction, resulting in obesity, as well as hypertriglyceridemia, nonalcoholic fatty liver disease and insulin resistance. Studies show FATP1 expression increases up to 2-fold in adipose tissue of obese subjects.

As used herein, the term "about" and/or "substantially" refers to a +/−10% variation from a nominal value/term. Such variation is always included in any given value/term provided herein, whether or not such variation is specifically referred thereto. As used herein, various singular forms "a," "an" and "the" are intended to include various plural forms as well, unless a context clearly indicates otherwise. Various terms "comprises," "includes," "comprising" and/or "including" when used in this specification specify a presence of stated features, integers, steps, operations, elements, and/or components, but do not preclude the presence and/or addition of one or more other features, integers, steps, operations, elements, components, and/or groups thereof. As used herein, a term "or" is intended to mean an inclusive "or" rather than an exclusive "or." That is, unless specified otherwise, or clear from context, "X employs A or B" is intended to mean any of a set of natural inclusive permutations. That is, if X employs A; X employs B; or X employs both A and B, then "X employs A or B" is satisfied under any of the foregoing instances.

The following examples are included to demonstrate illustrative embodiments of the present disclosure. It should be appreciated by those of skill in the art that the techniques disclosed in the examples that follow represent techniques discovered by the inventors to function well in the practice of the present disclosure, and thus can be considered to constitute one embodiment of modes for its practice. However, those of skill in the art should, in light of the present disclosure, appreciate that many changes can be made in the specific embodiments that are disclosed and still obtain a like or similar result without departing from the spirit and scope of the present disclosure.

EXAMPLES

Example 1—Study of the Efficacy of the Vaccine in High-Fat Fed Chicken Model The efficacy of the disclosed vaccine has been evaluated through studies. One such study was conducted in chickens which were fed with feed high in fat. The study protocol is shown in FIG. 1A. In the study, 12 healthy chickens were selected and divided into 2 groups (n=6 each). The first group was the vaccine group and the second was the control group. The chickens were numbered using leg tags. The chickens were fed using Breeder Mash Feed+20% pure coconut oil and given 150 g feed/bird per day.

To prepare the peptide antigen, 1 mg of customized antigen peptide was dissolved in 1 ml of 1×PBS and used as stock. The birds in the vaccine group were immunized using a dose of 100 µg antigen/bird. The location of the immunization was the intramuscular site of the chest muscle. The birds were put under observation and their health status was monitored regularly. The birds in the second group were given 1×PBS as control.

Blood samples were obtained from the birds under study. The site of blood collection was wiped with 70% ethanol. Blood samples were collected from the brachial wing vein. The blood parameters analyzed were triglycerides, alkaline phosphatase as marker for liver dysfunction, glucose and cholesterol.

It was observed that there was a 8.5% reduction in blood glucose in the treated group compared to the control group. There was no significant effect on cholesterol. It was observed that there was a 32% reduction in triglycerides in the treatment group compared to the control group. Further, it was observed that there was a 37% reduction of ALP in the treatment group suggesting improvement of liver function than the control group.

Figure 1B:
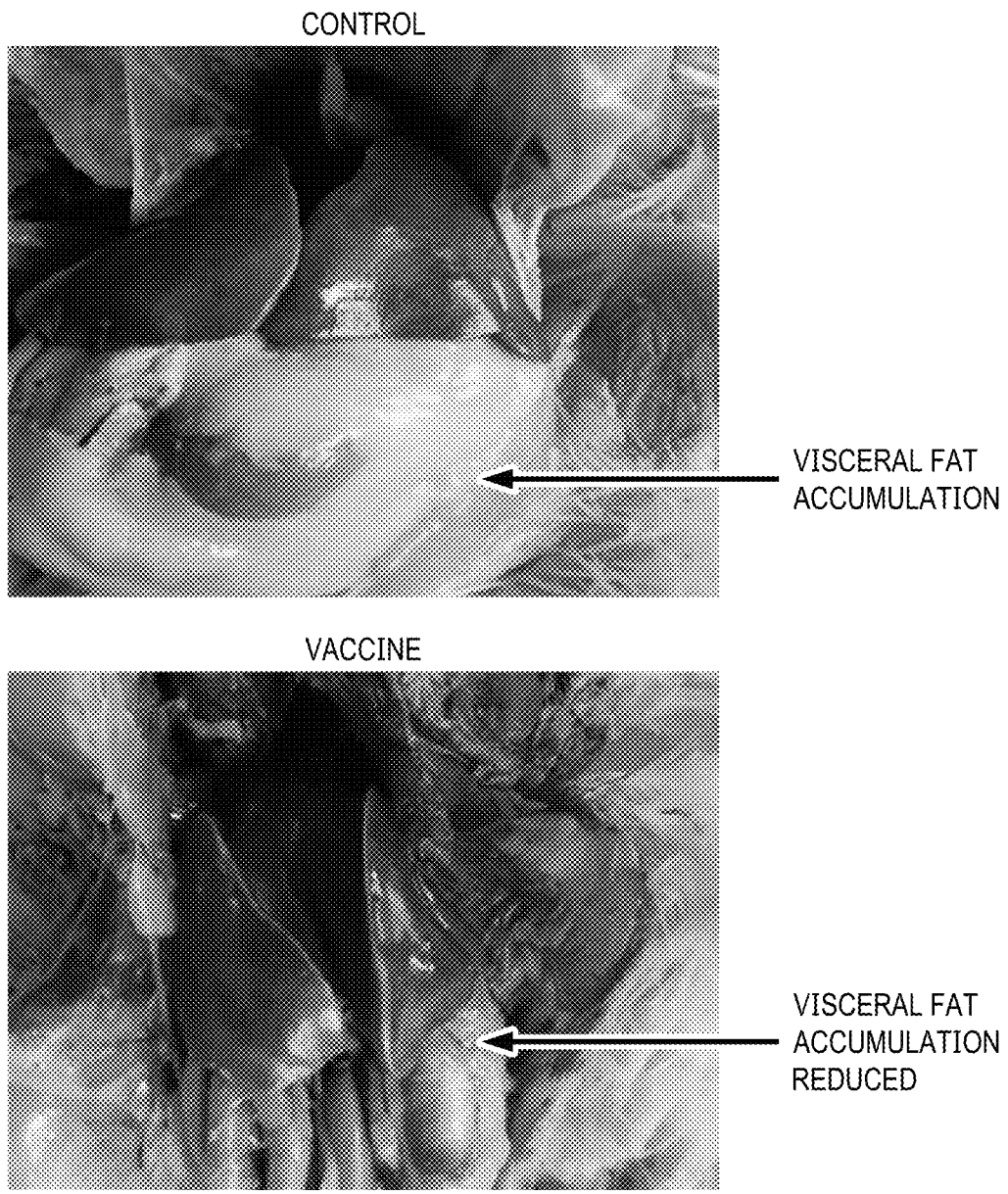

In a separate chicken study, where 2500 birds were fed normal diet and vaccinated with the FATP1 peptide in alum as an adjuvant, a drastic reduction is visceral fat accumulation was seen in the vaccine group compared to the control group (FIG. 1B).

In conclusion, the disclosed vaccine was found to markedly reduce plasma triglyceride levels, thereby indicating a therapeutic approach in humans especially for severe hypertriglyceridemia patients with levels over 400 mg/dl. There appears to be a modest improvement in plasma glucose levels and the liver enzyme alkaline phosphatase (ALP) indicating a reduction in liver triglyceride accumulation. Also, as stated above, even in the normal chow fed diet, the vaccine reduced the accumulation of visceral fat.

Example 2—Study of the Efficacy of the Vaccine in High-Fat Fed Rat Model

Figure 2:
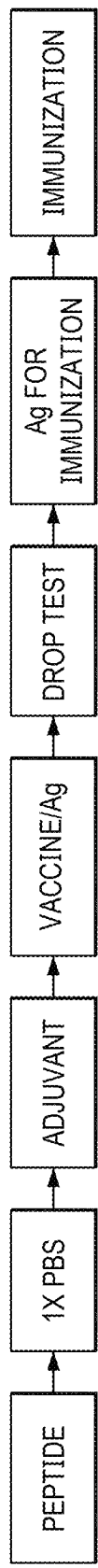
FIG. 2 shows the immunization protocol of the vaccine in rat study.

The efficacy of the disclosed vaccine was studied in a high-fat fed rat model, an often used model to study metabolic diseases, wherein the reduction in blood triglycerides, liver fat, visceral fat accumulation and body weight were evaluated. The study protocol is shown in FIG. 2.

Materials and Methods

Species details: species: rats (Wistar); justification: the rats (Wistar) are recognized by the international guidelines as the recommended test system and considerable historical data is available; source: good quality, healthy animals were procured from Hylasco Biotechnology India Pvt Ltd, (Reg. No. 1808/PO/RcBt/S/15/CPCSEA); animal age at the time of randomization: 07-08 weeks; animal weight at the time of randomization: males: 170±20 grams.

Husbandry and diet composition: number of animals: a total number of 6 animals (6M) per group; animal identification: individual cage tags; housing: animals were housed in stainless steel cages, one animal per cage; diet: pelleted rodent feed ad libitum; temperature: 30° C.; humidity: 30 to 70%; light: 12 hours light and 12 hours dark; water: RO purified water, ad libitum; cleaning of cages: twice in a week; acclimatization: the period of acclimatization was a minimum of seven days in the experimental room after the veterinary examination.

Study design: the dose schedule is shown in Table 1, below.

TABLE 1

Dose Schedule

| S No. | Group | Dose (in µg/rat) | Volume (µL/rat) | Route of administration | Conc. (mg/ml) | No. of animals |
|---|---|---|---|---|---|---|
| 1 | Disease group | — | — | — | — | 6M |
| 2 | Treatment group | 150 | 100 | Intramuscular | 3 | 6M |

IAEC approval: IAEC approval obtained for conducting the study UH/IAEC/MS/21/03/2024/08; test item name: GTX-SP-208; batch number: G2351-042; date of manufacture: 7 Aug. 2023; date of experiment: 1 year; source of test item details: Galore Tx Pharmaceuticals Pvt Ltd; therapeutic activity: anti-hyperlipidemic agent; characteristics: peptide; solubility: 100% soluble in phosphate buffered saline (PBS; 1×); dosage form: powder form; storage conditions: store at −20° C.; dose levels: one dose level by intramuscular route of administration; study duration: 9 weeks; administration of test item: weekly once for 7 consecutive weeks by intramuscular injection; dosage details: dosage regimen: clinical; drug dose: 100-150 µg per animal; duration of treatment: weekly once for 7 consecutive weeks; route of administration: intramuscular injection; dosage regimen: experimental; duration of treatment: weekly once for 7 consecutive weeks; route of administration: intramuscular injection. The dosage for rats extrapolated using standard guidelines.

Procedures

I. Dose Formulation

Formulation was freshly made just before dosing. For the primer dose of vaccine 3 mg peptide was dissolved in 1 ml of 1×PBS sterile solution to make 3 mg/mL stock solution. 0.4 mL of stock solution was combined with 0.4 mL of complete Freund's adjuvant by vigorous vortexing. For booster doses, the same procedure was followed except that the stock solution was combined with an equal amount of incomplete Freund's adjuvant instead of complete Freund's adjuvant.

Once the drop test was passed (the emulsion drop floated on water intact), the final formulation was administered to rats at 50 μL at each site of injection.

II. Experimental Procedures

After acclimatization period, body weights of rats were recorded. The rats were randomized based on body weight after quarantine period into two groups n=6 per group as disease control (6M) and treatment group (6M). The disease control and treatment groups were given a high fat diet ad libitum for 8 consecutive weeks while the treatment group received the vaccine doses by intramuscular route as per study design as weekly once dosing for 7 consecutive weeks.

Initial primer dose was given only once during the treatment initiation and the remaining 6 booster doses were administered weekly once to the treatment group animals. Sham group animals received a normal rodent diet fortified with fat. Blood samples were collected on week 0, week 2, week 4, week 6 and week 8 from animals and analyzed for fasting blood glucose, triglycerides, total cholesterol and lipid profile. At every blood collection, 12 hour fasting was maintained for animals. On the final necropsy day, animals were subjected to euthanasia and major organs like liver, heart, lungs, kidneys, testes, spleen, and epididymal fat were collected, weighed and recorded. Half portion of liver was stored immediately in liquid nitrogen and kept at −80° C. for oil red stain and the remaining half was stored in 10% formalin solution, which was taken for histological evaluation by hematoxylin and eosin (H & E) staining.

Blood was centrifuged at 40° C., 4000 RPM for 15 minutes to separate serum and plasma. The serum and plasma samples were analyzed for serum biochemistry and fasting blood glucose respectively. Remaining serum samples were stored at −80° C. until dispatch to the test facility.

III. Clinical Observations

General clinical observations were conducted twice daily and detailed clinical observations were conducted once daily.

The following observations were made: 1. home cage observations: no abnormalities were observed, and no adverse clinical signs were observed; 2. hand held observations: rats responded normally to hand held stimulation; 3. open field activity: the open field activity was found normal throughout study duration; 4. stimulus response: the stimulus response was found normal throughout study duration; 5. nervous and muscle measurements and other observations, if any.: No abnormalities observed.

RESULTS: It was found that there is a 42% reduction in serum triglycerides in the treated group compared to the control group. Similarly, a 58% reduction of VLDL, the major triglyceride-carrying lipoprotein in humans, was observed in treated group animals versus control group by administration of the vaccine. There were improvements in LDL (lowering) and HDL (increase). Similarly, there was 10% reduction in total serum cholesterol in the treatment group compared to the control group. A 22% reduction in body weight was observed in the treated group animals compared to the control group. There is 28% reduction in liver weight in the treated group than the control group. A 43% of loss in visceral fat deposition was observed in the treated group compared to the control group after high fat feed. It was observed that there is a correction of liver function by the vaccine based on a 67% decrease in liver enzyme dysfunction marker ALT.

Toxicology analysis showed no changes in hematocrit, critical organ weights and improvement in liver function (AST and ALT) in the 8 week study. ELISA data showed that the presence of antibodies against FATP1 peptide in sera of vaccinated animals increases within two weeks and continues to rise in eighth week after vaccination.

Example 3—Study of the Efficacy of the Vaccine in High-Fat Fed Mice Model

The efficacy of the disclosed vaccine was studied in a high-fat fed mice model wherein the reduction in blood triglycerides, liver fat, visceral fat accumulation and body weight were evaluated. This model is often referred to as diet induced obesity (DIO) model.

Species details: Species: mice—Balb/c; justification: Balb/c are recognized by the international guidelines as the recommended test system and considerable historical data available; source: Good quality healthy animals were procured from Experimental animal facility—Centre for DNA fingerprinting and diagnostics (2035/GO/RBi/S/18/CPC-SEA-Reg.no); animal age at the time of randomization: 8 weeks; animal weight at the time of randomization: males: 25-30 mg.

Husbandry and diet composition: number of animals: total number of 6 animals (6M) per group; animal identification: individual cage tags; housing: animals were housed in stainless steel cages, 6 animals in one cage; diet: high fat diet-diet with 60% kcal % fat; temperature: 30° C.; humidity: 30 to 70%; light: 12 hours light and 12 hours dark; water: RO purified water, ad libitum; cleaning of cages: twice in a week; acclimatization: the period of acclimatization was a minimum of seven days in the experimental room after the veterinary examination.

Study design: the dose schedule is shown in Table 2, below.

TABLE 2

Dose Schedule

| S No. | Group | Dose (in μg/rat) | Volume (μL/rat) | Route of administration | No. of animals |
|---|---|---|---|---|---|
| 1 | Disease group | — | — | — | 6M |
| 2 | Treatment group | 100 | 100 | Subcutaneous | 6M |

IAEC approval: IAEC approval obtained for conducting the study; test item name: UT-GT-001; batch number: G2467-145; date of manufacture: 9 Nov. 2024; date of experiment: 1 year; source of test item details: Galore Tx Pharmaceuticals Pvt Ltd; therapeutic activity: anti-hyperlipidemic agent; characteristics: peptide; solubility: 100% soluble in phosphate buffered saline (PBS; 1×); dosage form: powder form; storage conditions: store at −20° C.; dose levels: by subcutaneous route of administration; study duration: 8 weeks; administration of test item: weekly once for 7 consecutive weeks by subcutaneous injection.

Dosage details: dosage regimen: experimental; drug dose: 100 μg per animal; duration of treatment: weekly once for 7 consecutive weeks; route of administration: subcutaneous injection. The dosage for mice extrapolated using standard guidelines.

Procedures

I. Dose Formulation

Formulation was freshly made just before dosing. Primer dose of vaccine 1 mg peptide was dissolved in 1 ml of 1×PBS sterile solution to make 1 mg/mL stock solution. Immunization of peptide is along with Freund's adjuvant by proper mixing. For booster doses, the same procedure was followed except that the stock solution was combined with an equal amount of incomplete Freund's adjuvant instead of complete Freund's adjuvant. Once the drop test passed (the emulsion drop floated on water as intact), the final formulation was administered to mice with the volume of 300 µl.

II. Experimental Procedures

Immunization and blood collection. After the acclimatization period, body weights of mice were recorded. The mice were randomized based on body weight after the quarantine period into two groups n=6 per group as disease control and treatment group. The disease control and treatment groups were given high fat diet ad libitum for 8 consecutive weeks while the treatment group received the vaccine doses by subcutaneous route as per study design as weekly once dosing for 7 consecutive weeks.

Initial primer dose was given only once during the treatment initiation and the remaining 6 booster doses were administered weekly once to the treatment group animals. Blood was collected on week 0, week 2, week 4, week 6 and week 8 from animals and analyzed for fasting blood glucose, triglycerides, total cholesterol and lipid profile. At every blood collection, 12 hours fasting was maintained for animals. On the final necropsy day, animals were subjected to euthanasia and major organs like liver, heart, lungs, kidneys, testes, spleen, visceral fat were collected, weighed and recorded. All the organs were stored immediately in liquid nitrogen and kept at −80° C. for further analysis. Blood samples were given to the diagnostic center for different blood parameter analysis.

III Clinical Observation

No abnormalities were observed. No adverse clinical signs were observed. High fat diet intake and water intake was normal.

Western Blot experiment: Western blot experiment was performed using anti-sera (from the mice) of both treatment and control animal as primary antibody. Homogenized liver and adipose tissue samples of both the groups were used as protein samples to run the gel.

Triglyceride assay kit: Triglyceride colorimetric assay (Make:Elabscience cat.no:EBC-K238) was performed using triglyceride kit to check and compare the triglyceride content of all the organ/tissue samples of both the control and treatment group animals. Glycerinum was used as a standard. Twenty mg of required tissue samples was harvested and washed in cold PBS. Twenty mg tissue was homogenized in 180 µl of ethanol at 4° C. and centrifuged at 12000×g for 10 minutes. The supernatant was collected and used as the sample. 2.5 µl of standard was added to the samples in the respective wells. 250 µl of working solution was added to that and incubated at 37° C. for 10 minutes. After the incubation, the OD was measured at 510 nm.

RESULTS: Body weight of the treatment group showed reduction when compared to the control group. There was 61.5% reduction in triglyceride levels in the treatment group over time and after 14 days. It was observed that there is 58.7% reduction in glucose levels in the treatment group. There was no significant difference in cholesterol levels in the treated group. It was observed that there was 19% reduction in ALP levels in the treatment group compared to the vaccine group. It was observed that there was a 33.7% reduction in visceral fat in treatment group when compared to the control group after high fat feed. The control group showed fat deposition while the treatment group showed reduced deposition of fat. There was also significant weight loss observed in vaccinated animals. The treatment group liver weight was found to have reduced by 9% than the control group, while the spleen weight was increased in the vaccine group, and the lung weight, heart weight and kidney weight were decreased in the vaccine group compared to the control group. Marked lowering of fat accumulation was observed in the vaccine group versus control group.

Western blot using sera from vaccinated mice showed a clear single band corresponding to the molecular weight of FATP1 present in higher concentrations of liver and adipose tissue samples, thereby suggesting that there are antibodies to FATP1 present in serum of the vaccinated group. There was no band in liver and adipose tissue samples using sera from the untreated group in the FATP1 molecular weight range, suggesting that without vaccination there are no antibodies generated to FATP1. All the treatment group tissue samples were found to contain lesser TG content than the control group, showing that the vaccine does not lead to fat accumulation in these tissues (Table 3).

TABLE 3

| | TG (µmol/g wet weight) | |
|---|---|---|
| | Control | Treatment |
| Liver | 30.79204 | 20.63864 |
| Spleen | 23.55856 | 19.57684 |
| Kidney | 13.77015 | 12.74153 |
| Heart | 18.64777 | 14.00241 |
| Lungs | 18.64777 | 14.79876 |
| Adipose Tissue | 73.76153 | 49.80480 |

It was found that in the vaccine group there is lowering of triglycerides in all organs and adipose tissue, adipose tissue without dilution, and no excess accumulation of fat compared to the non-vaccinated group.

Example 4—Delayed Vaccine Intervention Study in High Fat Fed Mice

Figure 3:
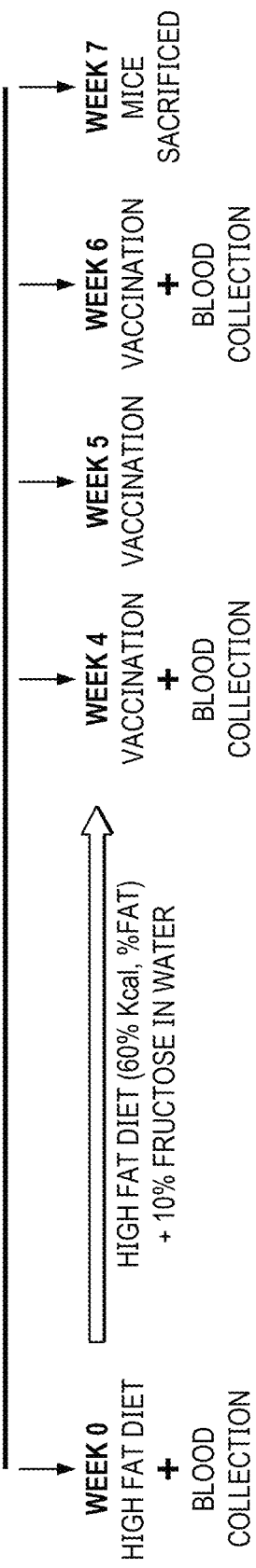
FIG. 3 shows the protocol for the delayed vaccine intervention study in high fat fed mice.

The protocol for the delayed vaccine intervention study in high fat fed mice is shown in FIG. 3. In this protocol, the animals were first fed high fat diet for two weeks and then the vaccine treatment was initiated. The results showed a drastic reduction in percentage of visceral fat in the delayed vaccine group (21.6%), as well as the normal vaccine group (18.3%), compared to control (62.5%). There were improvements in blood parameters glucose, cholesterol and triglycerides, and a significant reduction in ALP level. The delayed vaccine group showed a reduction in liver weight, spleen weight, an increase in lung weight, a decrease in heart weight, and almost no effect on kidney weight.

Example 5—Alum Adjuvant Preparation

The protocol for preparation of the alum adjuvant is as follows. 0.4% of aluminum hydroxide powder (Nice Brand, Catalog No. A11625) is used as an adjuvant. For a singe dose, 1 g of aluminum hydroxide powder is mixed with 250 ml of autoclaved Milli-Q® water, and 100 µl of the adjuvant is mixed with an equal amount of the vaccine. For two doses, 2 g of aluminum hydroxide powder is mixed with 500 ml of autoclaved Milli-Q® water.

Example 6—Monoclonal Antibody Preparation

The protocol for generation of monoclonal antibodies (mabs) to the peptide antigen (SEQ ID NO:1) is as follows. A phage display library containing millions of antibodies will be constructed and panned with the peptide antigen (SEQ ID NO:1) to identify the highest binding affinity monoclonal antibodies (to the FATP1 peptide). Those mabs with neutralizing activity against FATP1 demonstrated using a fatty acid uptake assay in a 3T3 L1 adipocyte model will be identified (GeNext Genomics, Nagpur, India). The best mab will be tested for efficacy in the above-mentioned chicken, mice and rat models. The effective monoclonal antibodies will then be sequenced and humanized.

Example 7—DNA Vaccine Against Fatp1

A DNA vaccine will be prepared against FATP1. The general protocol for generation of a DNA vaccine against FATP1 is as follows. A general expression construct design for a DNA vaccine is: promoter-5' leader sequence starts with a "G"-ribosome binding sequence-start codon-signal sequence-ATGCGTGCACCGGGCGCGGGCGCAGCAAGTGT GGTGAGT (SEQ ID NO:2)-stop codon-3' UTR-polyA signal. Promoters that can be used in the preparation of a DNA vaccine include, but are not limited to, a human cytomegalovirus (hCMV) promoter or a simian virus 40 (SV40) promoter. A non-limiting example of a 5' leader sequence that can be used in the preparation of a DNA vaccine is hTEE-658, starting with a "G". The hTEE-658 5' leader sequence is a short, 37-nucleotide sequence that enhances translation of mRNA in a cap-independent manner, particularly in mammalian cell culture. A non-limiting example of a ribosome binding site that can be used in the preparation of a DNA vaccine is a Kozak sequence. A non-limiting example of a signal sequence that can be used in the preparation of a DNA vaccine is the herpes simplex-2 GD2 protein signal sequence. The start codon is ATG. The stop codon can be TAA, TAG or TGA. A non-limiting example of a 3' UTR that can be used in the preparation of a DNA vaccine is a beta-globin 3" UTR. Poly A signals that can be used in the preparation of a DNA vaccine include, but are not limited to, the rabbit beta-globin or bovine growth hormone poly A signal.

The general steps in the production and application of DNA vaccine vector production are as follows. Stage 1 is bacterial propagation, fermentation and production, stage 2 is purification, formulation and stability, stage 3 is delivery, and stage 4 is eukaryotic expression and immunogenicity. Note that stages 1 and 4 interact, and are very sensitive to vector changes and should therefore be optimized in a coordinated fashion. For the insert design, the amino acid sequence (SEQ ID NO:1) and targeting is selected, the DNA sequence is designed, using codon optimization and usually removing any TTTT or Chi sites. Bioinformatics is used to remove Z-DNA, cruciform, palindromes, repeats, cryptic splice sites, RNA secondary structure, genome homology and alternative reding frames, and the gene is synthesized.

Certain techniques for generation and production of DNA vaccines can be found in a review article by Williams (*Vaccines* 1:225-249, 2013).

Example 8—RNA Vaccine Against Fatp1

An RNA vaccine will be prepared against FATP1. The general protocol for generation of an RNA vaccine against FATP1 is as follows. A general design for an RNA vaccine is: "G"-5' leader sequence-ribosome binding sequence-start codon-signal sequence-AUGCGUGCACCGGGCGCGGGCGCAGCAAGUGUG- GUGAGT (SEQ ID NO:3)-stop codon-3' UTR-polyA signal. The RNA is generally in vitro transcribed using the DNA expression vector using a DNA construct as given in Example 7, above. The 5'G of the transcribed RNA is modified by adding a 5 mG cap enzymatically, the sequence then reads, 5 mG-G-5'leader sequence . . . . Some of the uracil residues can be modified to pseudo-uracil to prevent innate immune responses. The other elements are the same as those described above for the DNA vaccine.

The general work flow is to reverse translate the protein antigen into the template DNA, which is then converted to mRNA by in vitro transcription using RNA polymerase. Important considerations are sequence optimization, such as uridine depletion, and replacement of UTP with 5-methoxy uridine or other modified bases, and delivery, which can utilize naked mRNA delivery into cells using electroporation, or delivery using a lipid nanoparticle. mRNA-LNPs that can be utilized include, but are not limited to, protamine-complexed mRNA, mRNA associated with a positively charged oil-in-water cationic nano-emulsion, mRNA associated with a chemically modified dendrimer and complexed with polyethylene glycol (PEG)-lipid, protamine-complexed mRNA in a PEG-lipid nanoparticle, mRNA associated with a cationic polymer such as polyethylenimine (PEI), mRNA associated with a cationic polymer such as PEI and a lipid component, mRNA associated with a poly-saccharide (for example, chitosan) particle or gel, mRNA in a cationic lipid nanoparticle, e.g., 1,2-dioleoyloxy-3-trimethylammoniumpropane (DOTAP) or dioleoylphosphatidy-lethanolamine (DOPE) lipids, mRNA complexed with cat-ionic lipids and cholesterol, or mRNA complexed with cationic lipids, cholesterol and PEG-lipid.

Example 9—Delivery of Vaccine

One method that will be used to deliver the vaccine for subcutaneous (SC), subcutaneous (SQ), or intramuscular (IM) injection is to use a lipid nanoparticle (LNP).

What is claimed is:

1. A vaccine comprising:
   a) a peptide consisting of the amino acid sequence of SEQ ID NO:1;
   b) a nucleotide encoding the amino acid sequence of SEQ ID NO:1; or
   c) a ribonucleotide encoding the amino acid sequence of SEQ ID NO:1.

2. The vaccine of claim 1, wherein the peptide is chemically modified.

3. The vaccine of claim 1, wherein the peptide is conjugated with an immunogenic protein or polyethylene glycol.

4. The vaccine of claim 1, wherein the quantity of the peptide ranges from about 0.1 mg to about 4.5 mg.

5. The vaccine of claim 1, wherein the peptide comprises at least a first D-amino acid.

6. The vaccine of claim 1, further comprising a buffer.

7. The vaccine of claim 6, wherein the buffer comprises phosphate-buffered saline (PBS).

8. The vaccine of claim 1, further comprising an adjuvant or a carrier protein.

9. The vaccine of claim 8, wherein the adjuvant is alum.

10. The vaccine of claim 8, wherein the quantity of the adjuvant ranges from about 0.1 ml to about 0.6 ml.

* * * * *

SEQUENCE LISTING

```
Sequence total quantity: 3
SEQ ID NO: 1            moltype = AA  length = 13
FEATURE                 Location/Qualifiers
source                  1..13
                        mol_type = protein
                        organism = synthetic construct
SEQUENCE: 1
```

```
MRAPGAGAAS VVS                                                              13

SEQ ID NO: 2            moltype = DNA  length = 39
FEATURE                 Location/Qualifiers
source                  1..39
                        mol_type = other DNA
                        organism = synthetic construct
SEQUENCE: 2
atgcgtgcac cgggcgcggg cgcagcaagt gtggtgagt                                  39

SEQ ID NO: 3            moltype = RNA  length = 39
FEATURE                 Location/Qualifiers
source                  1..39
                        mol_type = other RNA
                        organism = synthetic construct
SEQUENCE: 3
atgcgtgcac cgggcgcggg cgcagcaagt gtggtgagt                                  39
```